US012614318B1

(12) United States Patent
Simon et al.

(10) Patent No.: US 12,614,318 B1
(45) Date of Patent: Apr. 28, 2026

(54) SYSTEMS AND METHODS FOR FRAMING VIDEOS BASED ON IMAGE CAPTURE DEVICE MOTION

(71) Applicant: GoPro, Inc., San Mateo, CA (US)

(72) Inventors: Emmanuel Simon, Paris (FR); Nicolas Rahmouni, Paris (FR); Timothy David Bucklin, San Diego, CA (US); Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 166 days.

(21) Appl. No.: 18/431,437

(22) Filed: Feb. 2, 2024

(51) Int. Cl.
*G06T 11/00* (2006.01)
*G06T 7/20* (2017.01)
*G06T 7/73* (2017.01)

(52) U.S. Cl.
CPC ............... *G06T 11/00* (2013.01); *G06T 7/20* (2013.01); *G06T 7/73* (2017.01); *G06T 2207/10016* (2013.01)

(58) Field of Classification Search
CPC ... G06T 11/00; G06T 7/20; G06T 7/73; G06T 2207/10016
See application file for complete search history.

(56) References Cited

U.S. PATENT DOCUMENTS 10,230,925 B2 3/2019 Maciejewski
2015/0341536 A1 11/2015 Huang 2020/0177824 A1 6/2020 Yamaku
2021/0095966 A1* 4/2021 Li ............................. G01P 15/18
2022/0021821 A1* 1/2022 Douady ............... G06V 30/144
2023/0408264 A1* 12/2023 Wang ..................... G01C 21/30

OTHER PUBLICATIONS

Stojkovic et al.: Object Location Prediction in Real-time using LSTM Neural Network and Polynomial Regression [online] [Retrieved Sep. 18, 2025] <URL: https://arxiv.org/pdf/2311.13950> (Year: 2023).*

* cited by examiner

*Primary Examiner* — King Y Poon
*Assistant Examiner* — Vincent Alexander Providence
(74) *Attorney, Agent, or Firm* — Esplin & Associates, PC

(57) ABSTRACT

A video may be framed using information on the direction of gravity and the direction of north with respect to an image capture device during video capture, information on changes in the orientation of the image capture device during video capture, and information on the direction of motion of the image capture device during video capture. The changes in the orientation of the image capture device may be in an image capture device reference frame, and the direction of motion of the image capture device may be in the earth reference frame. The changes in the orientation of the image capture device and the direction of motion of the image capture device may be merged into a single reference frame using the direction of gravity and the direction of north with respect to the image capture device, and the video may be framed in the single reference frame to include the extents of the video in the direction of the motion of the image capture device during video capture.

7 Claims, 12 Drawing Sheets visual content 700 viewing window 750

System 10

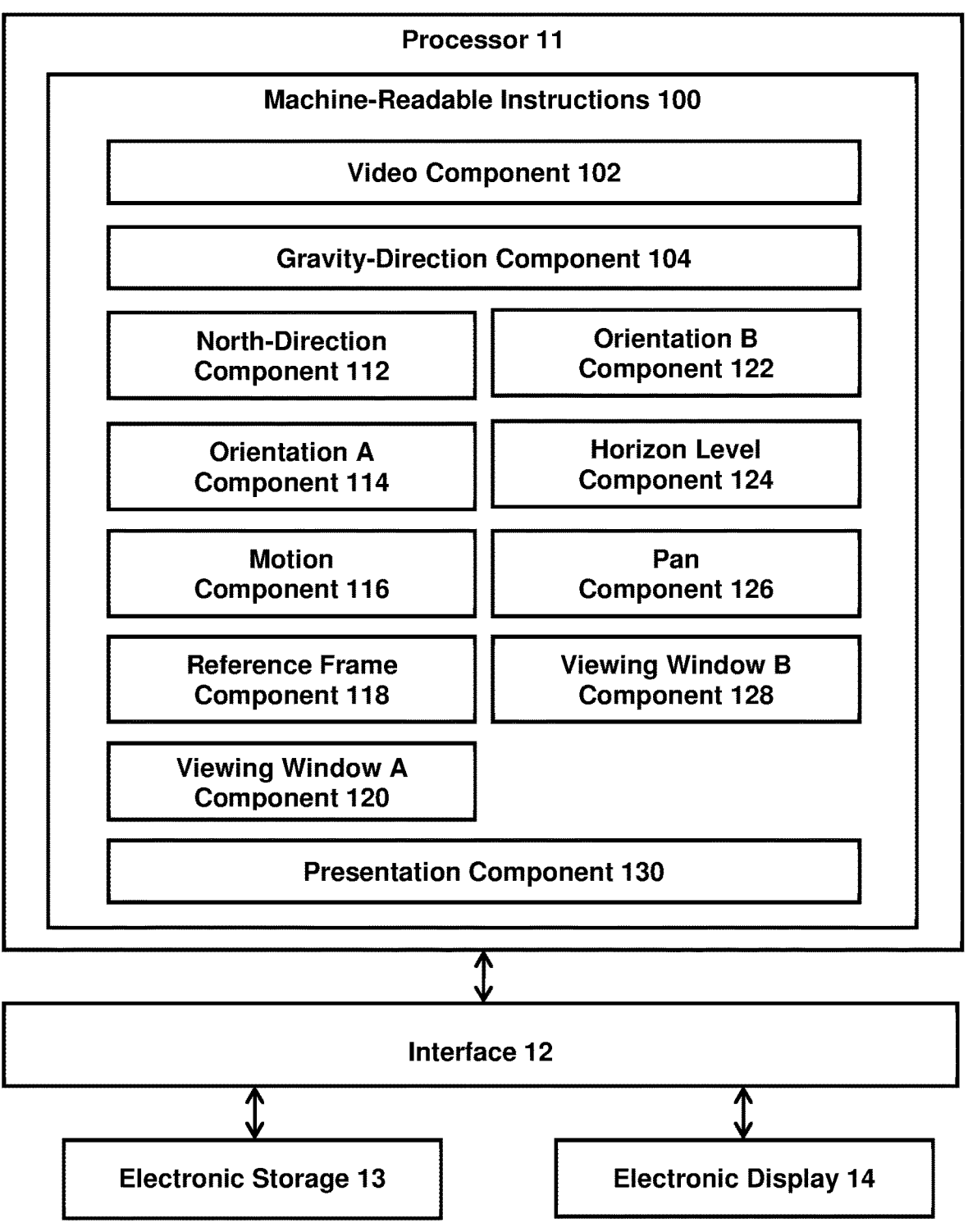

Processor 11

Machine-Readable Instructions 100

Video Component 102

Gravity-Direction Component 104

North-Direction
Component 112

Orientation B
Component 122

Orientation A
Component 114

Horizon Level
Component 124

Motion
Component 116

Pan
Component 126

Reference Frame
Component 118

Viewing Window B
Component 128

Viewing Window A
Component 120

Presentation Component 130

Interface 12

Electronic Storage 13

Electronic Display 14

FIG. 1

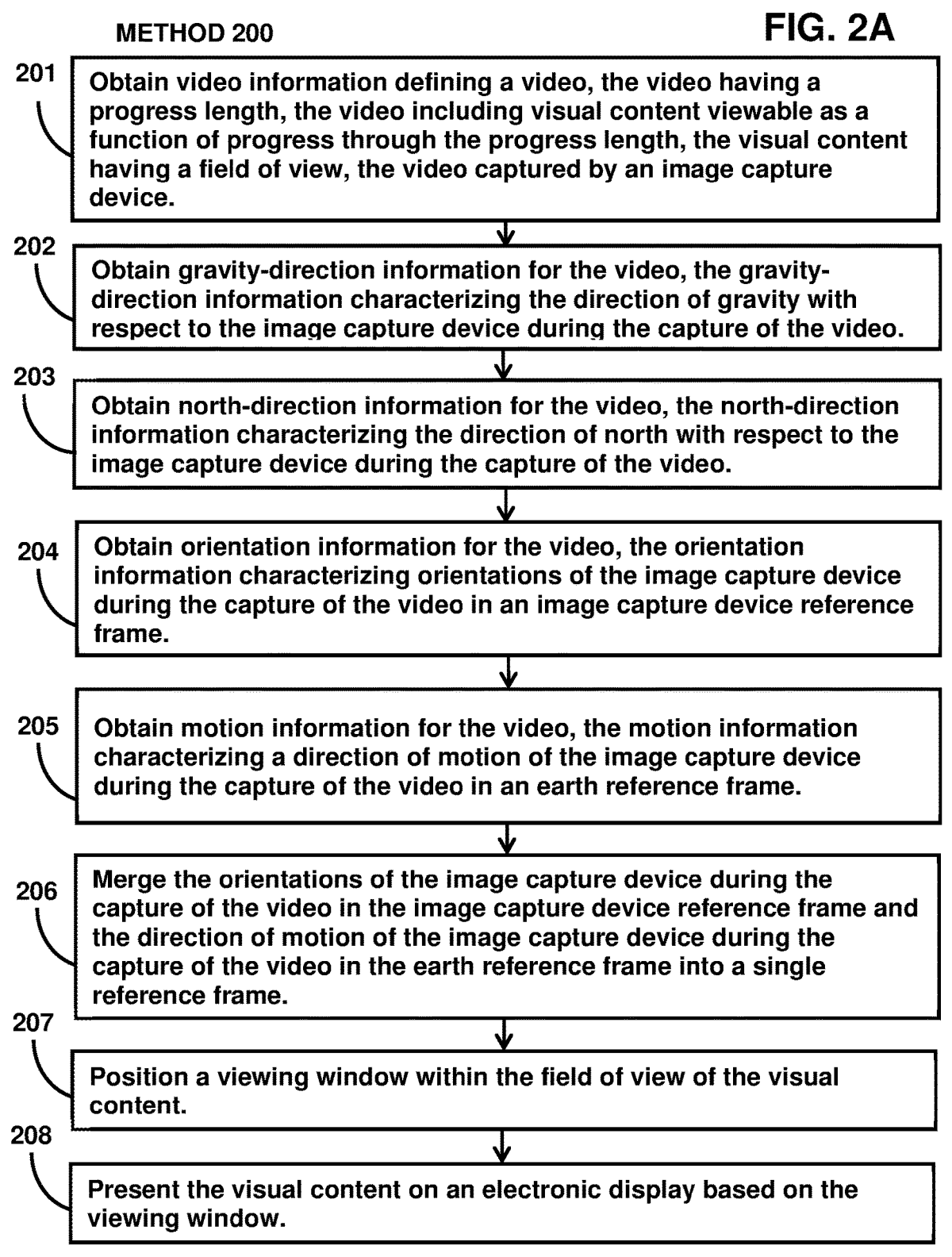

METHOD 200                                    FIG. 2A

201 Obtain video information defining a video, the video having a progress length, the video including visual content viewable as a function of progress through the progress length, the visual content having a field of view, the video captured by an image capture device.

202 Obtain gravity-direction information for the video, the gravity-direction information characterizing the direction of gravity with respect to the image capture device during the capture of the video.

203 Obtain north-direction information for the video, the north-direction information characterizing the direction of north with respect to the image capture device during the capture of the video.

204 Obtain orientation information for the video, the orientation information characterizing orientations of the image capture device during the capture of the video in an image capture device reference frame.

205 Obtain motion information for the video, the motion information characterizing a direction of motion of the image capture device during the capture of the video in an earth reference frame.

206 Merge the orientations of the image capture device during the capture of the video in the image capture device reference frame and the direction of motion of the image capture device during the capture of the video in the earth reference frame into a single reference frame.

207 Position a viewing window within the field of view of the visual content.

208 Present the visual content on an electronic display based on the viewing window.

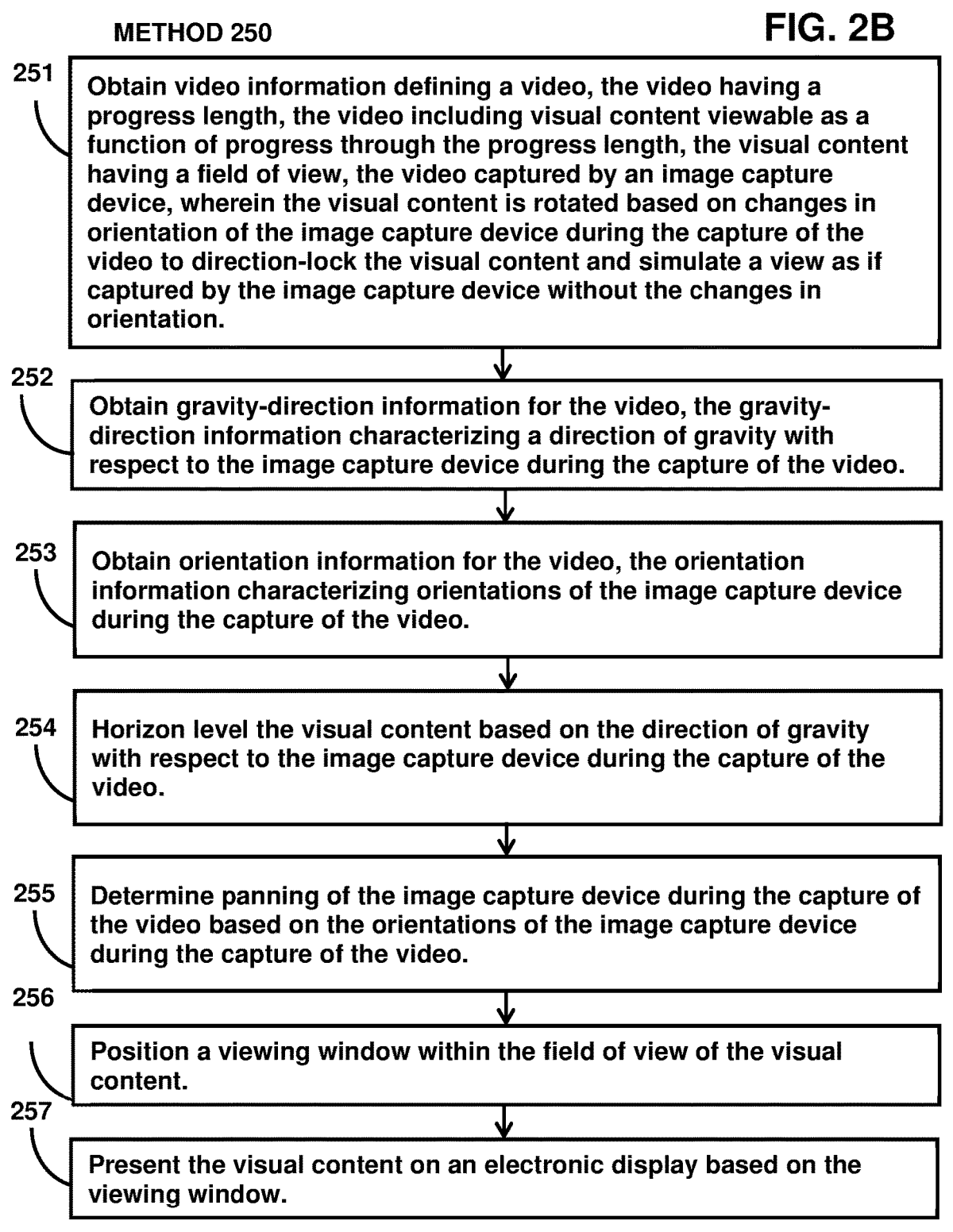

METHOD 250                                                    FIG. 2B

251 — Obtain video information defining a video, the video having a progress length, the video including visual content viewable as a function of progress through the progress length, the visual content having a field of view, the video captured by an image capture device, wherein the visual content is rotated based on changes in orientation of the image capture device during the capture of the video to direction-lock the visual content and simulate a view as if captured by the image capture device without the changes in orientation.

252 — Obtain gravity-direction information for the video, the gravity-direction information characterizing a direction of gravity with respect to the image capture device during the capture of the video.

253 — Obtain orientation information for the video, the orientation information characterizing orientations of the image capture device during the capture of the video.

254 — Horizon level the visual content based on the direction of gravity with respect to the image capture device during the capture of the video.

255 — Determine panning of the image capture device during the capture of the video based on the orientations of the image capture device during the capture of the video.

256 — Position a viewing window within the field of view of the visual content.

257 — Present the visual content on an electronic display based on the viewing window.

visual content 300 visual content 350 image capture device 400 visual content 450 image capture device   500 image capture device 600 visual content 650 visual content 700 viewing window 750 visual content 700 viewing window 750 image capture device path 800 capture orientation 910
direction and horizon locked orientation 920
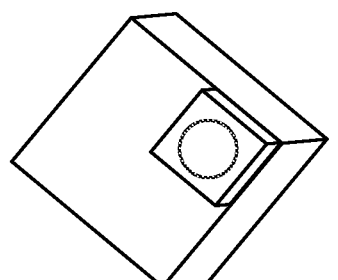
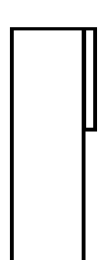
horizon locked and front directed orientation 930
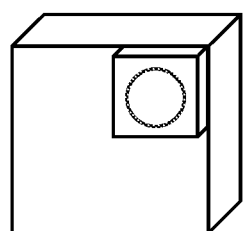
FIG. 9 image capture device path 1010 image capture device path 1020 image capture device path 1030 visual content 1100 viewing window 1110 visual content 1100 viewing window 1120

SYSTEMS AND METHODS FOR FRAMING VIDEOS BASED ON IMAGE CAPTURE DEVICE MOTION

FIELD

This disclosure relates to framing videos based on image capture device motion during video capture.

BACKGROUND

A video may have a wide field of view (e.g., spherical field of view). The wide field of view of the video may make it difficult to determine which parts (spatial extents) of the video contain interesting views. Manually reviewing the video to determine framing of the video may be difficult and time consuming.

SUMMARY

This disclosure relates to framing videos. Video information, gravity-direction information, north-direction information, orientation information, motion information, and/or other information may be obtained. The video information may define a video. The video may have a progress length. The video may include visual content viewable as a function of progress through the progress length. The visual content may have a field of view. The video may have been captured by an image capture device. The gravity-direction information for the video may characterize a direction of gravity with respect to the image capture device during the capture of the video. The north-direction information for the video may characterize a direction of north with respect to the image capture device during the capture of the video. The orientation information for the video may characterize orientations of the image capture device during the capture of the video in an image capture device reference frame. The motion information for the video may characterize the direction of motion of the image capture device during the capture of the video in an earth reference frame.

The orientations of the image capture device during the capture of the video in the image capture device reference frame and the direction of motion of the image capture device during the capture of the video in the earth reference frame may be merged into a single reference frame based on the direction of gravity with respect to the image capture device during the capture of the video, the direction of north with respect to the image capture device during the capture of the video, and/or other information. A viewing window may be positioned within the field of view of the visual content based on the orientations of the image capture device during the capture of the video and the direction of motion of the image capture device during the capture of the video in the single reference frame, and/or other information. The visual content may be presented on an electronic display based on the viewing window and/or other information.

A system for framing videos may include one or more electronic storage, processor, and/or other components. The electronic storage may store information relating to an image capture device, video information, information relating to a video, information relating to visual content, information relating to a viewing window, gravity-direction information, information relating to the direction of gravity with respect to the image capture device, north-direction information, information relating to the direction of north with respect to the image capture device, orientation information, information relating to orientations of the image capture device, information relating to an image capture device reference frame, information relating to an earth reference frame, information relating to a single reference frame, motion information, information relating to the direction of motion of the image capture device, information relating to a viewing window, information relating to presentation of the visual content, and/or other information.

The processor(s) may be configured by machine-readable instructions. Executing the machine-readable instructions may cause the processor(s) to facilitate framing videos. The machine-readable instructions may include one or more computer program components. The computer program components may include one or more of a video component, a gravity-direction component, a north-direction component, an orientation component, a motion component, a reference frame component, a viewing window component, a presentation component, and/or other computer program components.

The video component may be configured to obtain video information and/or other information. The video information may define a video. The video may have a progress length. The video may include visual content viewable as a function of progress through the progress length. The visual content may have a field of view. The video may be captured by an image capture device.

In some implementations, the video may include a spherical video. The spherical video may include visual content having a spherical field of view.

The gravity-direction component may be configured to obtain gravity-direction information and/or other information. The gravity-direction information for the video may characterize a direction of gravity with respect to the image capture device during the capture of the video.

The north-direction component may be configured to obtain north-direction information and/or other information. The north-direction information for the video may characterize a direction of north with respect to the image capture device during the capture of the video.

The orientation component may be configured to obtain orientation information and/or other information. The orientation information for the video may characterize orientations of the image capture device during the capture of the video in an image capture device reference frame. In some implementations, the orientation information may characterize the orientations of the image capture device during the capture of the video by characterizing an initial orientation of the image capture device at beginning of the capture of the video and changes from the initial orientation of the image capture device during the capture of the video.

The motion component may be configured to obtain motion information and/or other information. The motion information for the video may characterize the direction of motion of the image capture device during the capture of the video in an earth reference frame. In some implementations, the motion information may characterize the direction of motion of the image capture device during the capture of the video by including GPS locations of the image capture device during the capture of the video.

The reference component may be configured to merge the orientations of the image capture device during the capture of the video in the image capture device reference frame and the direction of motion of the image capture device during the capture of the video in the earth reference frame into a single reference frame based on the direction of gravity with respect to the image capture device during the capture of the video, the direction of north with respect to the image capture device during the capture of the video, and/or other information.

The viewing window component may be configured to position a viewing window within the field of view of the visual content based on the orientations of the image capture device during the capture of the video and the direction of motion of the image capture device during the capture of the video in the single reference frame, and/or other information. In some implementations, the viewing window may be positioned within the field of view of the visual content to include an extent of the visual content in the direction of motion of the image capture device during the capture of the video.

In some implementations, the direction of motion of the image capture device at a given moment during the capture of the video may be determined based on a given GPS location of the image capture device at the given moment, one or more future GPS locations of the image capture device at one or more future moments during the capture of the video, and/or other information. The direction of motion of the image capture device at the given moment during the capture of the video may be determined based on a combination of a short-term estimation of the direction of motion of the image capture device and a long-term estimation of the direction of motion of the image capture device, and/or other information.

In some implementations, the short-term estimation of the direction of motion of the image capture device may be determined based on the given GPS location of the image capture device at the given moment and a first future GPS location of the image capture device at a first future moment, and the long-term estimation of the direction of motion of the image capture device may be determined based on the given GPS location of the image capture device at the given moment and a second future GPS location of the image capture device at a second future moment. The second future GPS location may be farther apart from the given GPS location than the first future GPS location.

In some implementations, the impact of the long-term estimation of the direction of motion of the image capture device on the determination of the direction of motion of the image capture device may increase with greater collinearity between the short-term estimation of the direction of motion of the image capture device and the long-term estimation of the direction of motion of the image capture device. The impact of the long-term estimation of the direction of motion of the image capture device on the determination of the direction of motion of the image capture device may decrease with less collinearity between the short-term estimation of the direction of motion of the image capture device and the long-term estimation of the direction of motion of the image capture device.

The presentation component may be configured to present the visual content on an electronic display based on the viewing window.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 1 illustrates an example system for framing videos.

FIG. 2A illustrates an example method for framing videos.

FIG. 2B illustrates an example method for framing videos.

FIG. 9 illustrates example orientations of an image capture device.

DETAILED DESCRIPTION

Figure 3A:
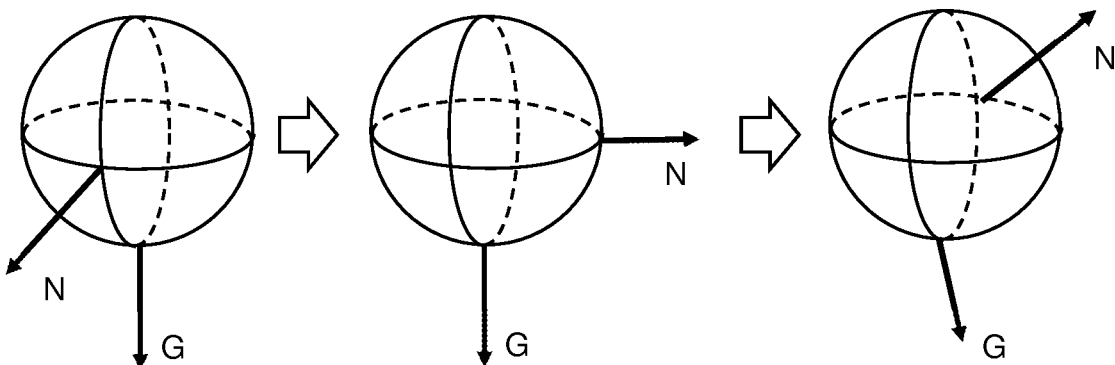
FIG. 3A illustrates example visual content.

FIG. 1 illustrates a system 10 for framing videos. The system 10 may include one or more of a processor 11, an interface 12 (e.g., bus, wireless interface), an electronic storage 13, an electronic display 14, and/or other components.

In some implementations, video information, gravity-direction information, north-direction information, orientation information, motion information, and/or other information may be obtained by the processor 11. The video information may define a video. The video may have a progress length. The video may include visual content viewable as a function of progress through the progress length. The visual content may have a field of view. The video may have been captured by an image capture device. The gravity-direction information for the video may characterize a direction of gravity with respect to the image capture device during the capture of the video. The north-direction information for the video may characterize a direction of north with respect to the image capture device during the capture of the video. The orientation information for the video may characterize orientations of the image capture device during the capture of the video in an image capture device reference frame. The motion information for the video may characterize the direction of motion of the image capture device during the capture of the video in an earth reference frame.

The orientations of the image capture device during the capture of the video in the image capture device reference frame and the direction of motion of the image capture device during the capture of the video in the earth reference frame may be merged into a single reference frame by the processor 11 based on the direction of gravity with respect to the image capture device during the capture of the video, the direction of north with respect to the image capture device during the capture of the video, and/or other information. A viewing window may be positioned within the field of view of the visual content by the processor 11 based on the orientations of the image capture device during the capture of the video and the direction of motion of the image capture device during the capture of the video in the single reference frame, and/or other information. The visual content may be presented on an electronic display by the processor 11 based on the viewing window and/or other information.

In some implementations, video information, gravity-direction information, orientation information, and/or other information may be obtained by the processor 11. The video information may define a video. The video may have a progress length. The video may include visual content viewable as a function of progress through the progress length. The visual content may have a field of view. The video may be captured by an image capture device. The visual content may be rotated based on changes in orientation of the image capture device during the capture of the video to direction-lock the visual content and simulate a view as if captured by the image capture device without the changes in orientation.

The gravity-direction information for the video may characterize a direction of gravity with respect to the image capture device during the capture of the video. The visual content may be horizon leveled based on the direction of gravity with respect to the image capture device during the capture of the video and/or other information. The orientation information for the video may characterize orientations of the image capture device during the capture of the video. Panning of the image capture device during the capture of the video may be determined by the processor 11 based on the orientations of the image capture device during the capture of the video and/or other information. A viewing window may be positioned within the field of view of the visual content by the processor 11 based on the panning of the image capture device during the capture of the video and/or other information. The visual content may be presented on an electronic display by the processor 11 based on the viewing window and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to an image capture device, video information, information relating to a video, information relating to visual content, information relating to a viewing window, gravity-direction information, information relating to the direction of gravity with respect to the image capture device, north-direction information, information relating to the direction of north with respect to the image capture device, orientation information, information relating to orientations of the image capture device, information relating to an image capture device reference frame, information relating to an earth reference frame, information relating to a single reference frame, motion information, information relating to the direction of motion of the image capture device, information relating to panning of the image capture device, information relating to a viewing window, information relating to position of the viewing window, information relating to presentation of the visual content, and/or other information.

The electronic display 14 may refer to an electronic device that provides visual presentation of information. The electronic display 14 may include a color display and/or a non-color display. In some implementations, the electronic display 14 may include a touchscreen display. The electronic display 14 may be configured to visually present information. The electronic display 14 may present information using/within one or more graphical user interfaces. For example, the electronic display 14 may present information relating to an image capture device, video information, information relating to a video, information relating to visual content, information relating to a viewing window, gravity-direction information, information relating to the direction of gravity with respect to the image capture device, north-direction information, information relating to the direction of north with respect to the image capture device, orientation information, information relating to orientations of the image capture device, information relating to an image capture device reference frame, information relating to an earth reference frame, information relating to a single reference frame, motion information, information relating to the direction of motion of the image capture device, information relating to panning of the image capture device, information relating to a viewing window, information relating to position of the viewing window, information relating to presentation of the visual content, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. The image capture device may carry other types of sensors, such as motion sensor(s) (e.g., accelerometer, gyroscope, inertial measurement unit), location sensor(s) (e.g., GPS sensor, magnetic field sensor, magnetometer), and/or other sensor(s).

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to determine which spatial extent of the scene depicted within the video should be presented/included in a 2D video. Manually setting the spatial extents of the video included in the presentation/2D video may be difficult and time consuming.

The present disclosure enable automatic framing of a video based on the direction in the which image capture device was moving when it captured the video. Framing of a video may include determination of which spatial extents of the video are included in a presentation/2D video. An image capture device may move during capture of a video, and the video may be framed for presentation based on the direction of the image capture device motion (translation motion, rotational motion). For example, the video may be framed to include the extents of the video in the direction of the motion of the image capture device during capture of the video.

In some implementations, the video may be framed using information on the direction of gravity and the direction of north with respect to the image capture device during video capture, information on changes in the orientation of the image capture device during video capture, and information on the motion of the image capture device during video capture. The information on the motion of the image capture device may include changes in GPS locations of the image capture device. The changes in the orientation of the image capture device may be in an image capture device reference frame, and the motion of the image capture device may be in the earth reference frame. The changes in the orientation of the image capture device and the motion of the image capture device may be merged into a single reference frame using the direction of gravity and the direction of north with respect to the image capture device. For example, a gravity direction vector and a north direction vector on the image capture device may be used to merge the orientation changes and the motion of the image capture device into a single reference frame. The video may be framed in the single reference frame to include the extents of the video in the direction of the motion of the image capture device during video capture. Such framing of the video may be referred to as merged reference framing.

In some implementations, the video may be framed using information on direction-locking of the video. The video may be rotated based on changes in the orientation of the image capture device during video capture to simulate a video captured with the image capture device pointed in the same direction (e.g., north direction). Panning may be used to frame the video in the direction of the motion of the image capture device. The direction and amount of panning may be determined by inverting the pan rotation that was performed on the video to direction-lock the video. Such framing of the video may be referred to as inverted direction-lock framing.

In some implementations, the video may be framed using both the merged reference framing and the inverted direction-lock framing. For example, the video may be framed using the merged reference framing when the information on the direction of gravity, the direction of north, and the motion of the image capture device is available. The video may be framed using the inverted direction-lock framing when the information on the direction of gravity, the direction of north, or the motion of the image capture device is unavailable. For example, the video framing may use the merged reference framing when the necessary information is available and switch to using the inverted direction-lock framing when the necessary information is unavailable (e.g., GPS signal for image capture device is lost or there is low confidence on the direction of north from the magnetometer). The inverted direction-lock framing may be used to fill holes in information needed to perform the merged reference framing.

Referring back to FIG. 1, the processor 11 (or one or more components of the processor 11) may be configured to obtain information to facilitate framing videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a motion sensor, a location sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos. The machine-readable instructions 100 may include one or more computer program components. The machine-readable instructions 100 may include one or more of a video component 102, a gravity-direction component 104, a north-direction component 112, an orientation A component 114, a motion component 116, a reference frame component 118, a viewing window A component 120, an orientation B component 122, a horizon level component 124, a pan component 126, a viewing window B component 128, a presentation component 130, and/or other computer program components.

The video component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The video may include visual content viewable as a function of progress through the progress length of the video. The visual content may have a field of view. A field of view of a video/visual content may refer to a field of view of a scene captured within the video/visual content (e.g., within video frames). A field of view of a video/visual content may refer to the extent of a scene that is captured within the video/visual content.

A video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. The spherical video may include spherical visual content (visual content having spherical field of view) viewable as a function of progress through the progress length of the video. Spherical field of view may include a complete sphere or a partial sphere. Other fields of view of videos are contemplated. A wide field of view video may include and/or may be associated with spatial audio.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The video may be captured by an image capture device. The video may be captured by an image capture device while the image capture device is experiencing motion. The motion experienced by the image capture device may include rotational motion (e.g., rotation of the image capture device about yaw axis, pitch axis, and/or roll axis) and/or translational motion (e.g., lateral and/or vertical movement). The motion experienced by the image capture device may include intentional motion (e.g., intended movement of the image capture device) and/or unintentional motion (e.g., unintended shaking/jitter of the image capture device).

The visual content may be rotated based on changes in orientation of the image capture device during the capture of the video. A change in orientation of the image capture device may refer to a change in rotational position of the image capture device. A change in orientation of the image capture device may refer to a change in relative physical position of the image capture device with respect to a reference (e.g., the ground/horizon). A change in orientation of the image capture device may refer to a change in where/direction in the image capture device is pointed.

The visual-content may be direction-locked. The visual content may be rotated based on changes in orientation of the image capture device during the capture of the video to direction-lock the visual content and simulate a view as if captured by the image capture device without the changes in orientation. Direction-locking of the visual content may refer to modification (e.g., rotation, warping) of the visual content so that a direction in the visual content is pointed towards the same geographic direction in the real world. Direction-locking of the visual content may cause visual content captured by a rotating image capture device to appear as if captured by a non-rotating image capture device. For example, visual content of a spherical video may be direction-locked so that the front/default direction of the visual content depicts a scene in a particular geographic direction (e.g., initial direction in which the image capture device is pointed). For instance, visual content of a spherical video may be north-locked so that the front/default direction of the visual content depicts a scene in the north direction. Direction-locking of visual content in other directions is contemplated. In some implementations, direction-locking of visual content may include horizon-leveling of the visual content. Horizon-leveling of the visual content may include rotation of the visual content to account for tilt/roll in the image capture device during capture to simulate a view as if captured by a horizon-leveled image capture device.

FIG. 3A illustrates example visual content 300. The visual content 300 may be captured by an image capture device. The image capture device may have experience motion while capturing the visual content 300. The motion of the image capture device during capture may cause the same extents of the visual content 300 to depict different directions in the real world. For example, the image capture device may have been leveled and orientated towards the north in the beginning of the capture so that the front of the visual content 300 is aligned with the north direction (N) and the bottom of the visual content is aligned with the gravity direction (G). During the middle of the capture, the image capture device may have been rotated so that the left of the visual content 300 is aligned with the north direction (the image capture device is oriented towards the west direction). At the end of the capture, the image capture device may have been rotated so that the back of the visual content is aligned with the north direction and the bottom of the visual content not aligned with the gravity direction (the image capture device is oriented towards the south direction and tilted with respect to ground).

Figure 3B:
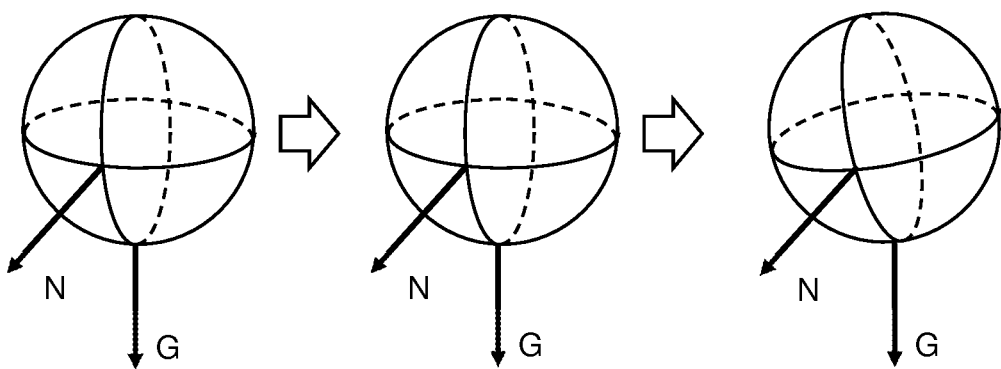
FIG. 3B illustrates example direction-locked visual content.

FIG. 3B illustrates example direction-locked visual content 350. The direction-locked visual content 350 may be generated by rotation of the visual content based on changes in orientation of the image capture device during capture. The direction-locked visual content 350 may simulate a view captured by an image capture device that did not experience changes in orientation during capture. Throughout the progress length of the visual content 350, the front of the visual content 350 may be aligned with the north direction and the bottom of the visual content 350 may be aligned with the gravity direction.

The gravity-direction component 104 may be configured to obtain gravity-direction information for the video and/or other information. In some implementations, the gravity-direction component 104 may be configured to identify the gravity-direction information associated with the video and obtain the associated gravity-direction information. In some implementations, the gravity-direction information for the video may be stored with the video. For example, the gravity-direction information for the video may be stored as metadata of the video, and the gravity-direction component 104 may be configured to obtain the gravity-direction information by extracting the gravity-direction information from the metadata of the video. In some implementations, the gravity-direction information may be generated by one or more motion sensors of the image capture device. For instance, the gravity-direction information may be generated by one or more accelerometers and/or one or more inertial measurement units of the image capture device.

The gravity-direction information for the video may characterize the direction of gravity with respect to the image capture device during the capture of the video. The gravity-direction information for the video may characterize the direction of gravity with respect to the image capture device at different moments during the capture of the video. The gravity-direction information may characterize the direction of gravity with respect to the image capture device during the capture of the video by defining, describing, identifying, quantifying, reflecting, and/or otherwise characterizing the direction of gravity with respect to the image capture device during the capture of the video.

The direction of gravity with respect to the image capture device may refer to in what direction and/or by what amount (e.g., angle) the image capture device is pointed away from the direction of gravity, or vice versa. The direction of gravity with respect to the image capture device may refer to the direction in which the gravity of earth act on the image capture device. The gravity-direction information may characterize the direction in which the gravity of earth acted on the image capture device at different moments during the capture of the video. The direction of gravity with respect to the image capture device may determine how the visual content captured by the image capture device is oriented with respect to the direction of gravity. The direction of the gravity may be defined/expressed in the image capture device reference frame. For example, the direction of gravity with respect to the image capture device may be defined by/expressed within a vector (unit vector) pointing towards the earth/aligned with gravity in the image capture device reference frame. The vector may indicate the direction of gravity from the image capture device.

The north-direction component 112 may be configured to obtain north-direction information for the video and/or other information. In some implementations, the north-direction component 112 may be configured to identify the north-direction information associated with the video and obtain the associated north-direction information. In some implementations, the north-direction information for the video may be stored with the video. For example, the north-direction information for the video may be stored as metadata of the video, and the north-direction component 112 may be configured to obtain the north-direction information by extracting the north-direction information from the metadata of the video. In some implementations, the north-direction information may be generated by one or more location sensors of the image capture device. For instance, the north-direction information may be generated by one or more magnetic field sensors and/or one or more magnetometers of the image capture device.

The north-direction information for the video may characterize the direction of north with respect to the image capture device during the capture of the video. The north-direction information for the video may characterize the direction of north with respect to the image capture device at different moments during the capture of the video. The north-direction information may characterize the direction of north with respect to the image capture device during the capture of the video by defining, describing, identifying, quantifying, reflecting, and/or otherwise characterizing the direction of north with respect to the image capture device during the capture of the video.

The direction of north with respect to the image capture device may refer to in what direction and/or by what amount (e.g., angle) the image capture device is pointed away from the direction of north, or vice versa. The direction of north with respect to the image capture device may refer to the direction of north from the image capture device. The north-direction information may characterize the direction of north from the image capture device at different moments during the capture of the video. The direction of north with respect to the image capture device may determine how the visual content captured by the image capture device is oriented with respect to the direction of north. The direction of the north may be defined/expressed in the image capture device reference frame. For example, the direction of north with respect to the image capture device may be defined by/expressed within a vector (unit vector) pointing towards the north/aligned with the direction to the north in the image capture device reference frame. The vector may indicate the direction of north from the image capture device.

The direction of north with respect to the image capture device may include the direction of geographic north from the image capture device and/or the direction of magnetic north from the image capture device. The direction of magnetic north from the image capture device may be converted into the direction of geographic north from the image capture device based on the location of the image capture device.

Figure 4A:
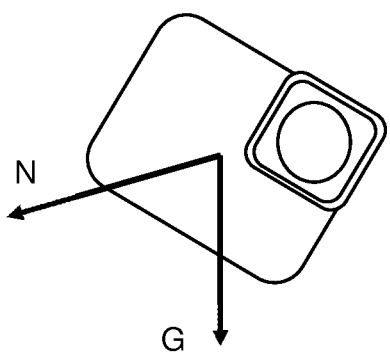
FIG. 4A illustrates an example image capture device.
Figure 4B:
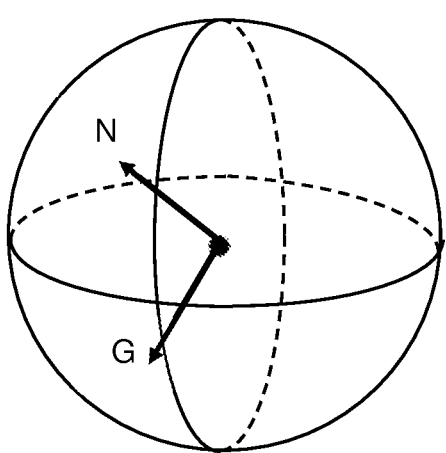
FIG. 4B illustrates example visual content captured by an image capture device.

FIG. 4A illustrates an example image capture device 400. The image capture device 400 may be oriented such that the front of the image capture device 400 is pointed away from the north direction. The image capture device 400 may be oriented such that it is tilted with respect to the horizon. FIG. 4B illustrates example visual content captured 450 by the image capture device 400. Orientation of the image capture device 400 may result in the front of the visual content 450 not depicting the part of the scene in the direction of north and the bottom of the visual content not being aligned with the direction of gravity.

The orientation A component 114 may be configured to obtain orientation information for the video and/or other information. In some implementations, the orientation A component 114 may be configured to identify the orientation information associated with the video and obtain the associated orientation information. In some implementations, the orientation information for the video may be stored with the video. For example, the orientation information for the video may be stored as metadata of the video, and the orientation component A 114 may be configured to obtain the orientation information by extracting the orientation information from the metadata of the video. In some implementations, the orientation information may be generated by one or more motion sensors of the image capture device. For instance, the orientation information may be generated by one or more gyroscopes and/or one or more inertial measurement units of the image capture device.

The orientation information for the video may characterize orientations of the image capture device during the capture of the video in the image capture device reference frame. The orientation information for the video may characterize the orientations of the image capture device at different moments during the capture of the video. The orientation information may characterize the orientations of the image capture device during the capture of the video by defining, describing, identifying, quantifying, reflecting, and/or otherwise characterizing the orientations of the image capture device during the capture of the video.

The orientations of the image capture device may refer to rotational positions of the image capture device. The orientations of the image capture device may refer to the relative physical positions of the image capture device with respect to a reference (e.g., the ground/horizon). The orientations of the image capture device may refer to where/directions in which the image capture device is pointed.

The orientations of the image capture device may be defined/expressed in the image capture device reference frame. The image capture device reference frame may use the image capture device itself as the frame of reference. The orientations of the image capture device may be defined/expressed with respect to the image capture device, rather than the earth. For example, the orientation information may characterize the orientations of the image capture device during the capture of the video by characterizing an initial orientation of the image capture device at the beginning of the capture of the video and changes from the initial orientation of the image capture device during the capture of the video. The initial orientation of the image capture device may be used as the frame of reference from which the orientations of the image capture device are defined/expressed. The initial orientation of the image capture device may refer to the orientation of the image capture device at the start of the video capture. For instance, the initial orientation of the image capture device may refer to the orientation of the image capture device during capture of the first video frame. The orientations of the image capture device at other moments in the video capture may be defined/expressed as the different from the initial orientation of the image capture device. For example, the orientations of the image capture device for other video frames may be given by the direction and/or the amount (e.g., angle) the image capture device is pointed away from the initial orientation of the image capture device. The orientations of the image capture device (camera orientations or CORI) may be defined/expressed as quaternion specifying the rotation between the initial image capture device orientation and the image capture device orientation at which a particular video frame was captured.

Figure 5:
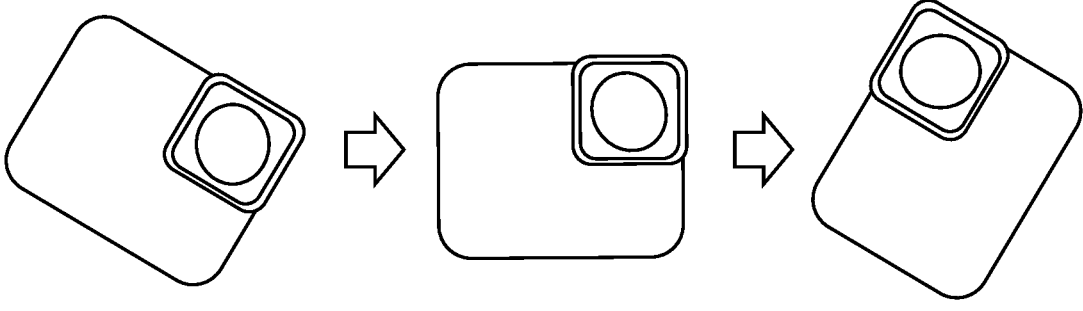
FIG. 5 illustrates example orientations of an image capture device.

FIG. 5 illustrates example orientations of an image capture device 500. FIG. 5 may show example orientations of the image capture device at different moments during capture of a video. For instance, the video capture may begin with the image capture device being tiled with respect to the horizon. During the capture of the video, the image capture device may be leveled with respect to horizon. Later in the capture of the video, the image capture device may be tiled in the opposite direction. Other orientations of an image capture device are contemplated.

Figure 6A:
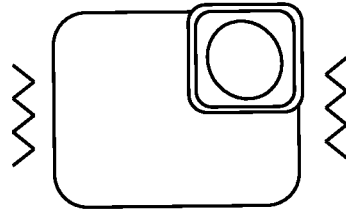
FIG. 6A illustrates an example shaking of an image capture device.
Figure 6B:
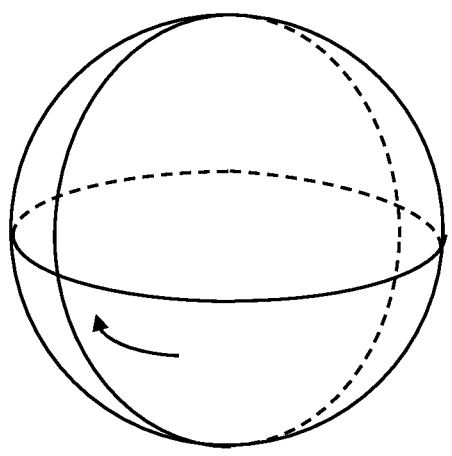
FIG. 6B illustrates an example stabilization of visual content.

In some implementations, the visual content may be rotated based on stabilization of the visual content. Stabilization of the visual content may refer to modification of the visual content to provide a more stable view. Stabilization of the visual content may refer to modification of the visual content to remove/reduce the amount of unintended motion depicted within the visual content. For example, the image capture device may experience unintended shaking/jitter during capture of the visual content, and the visual content may be stabilized to remove/reduce the amount of shaking/jitter in the visual content. FIG. 6A illustrates an example shaking of an image capture device 600. FIG. 6B illustrates example visual content 650 captured by the image capture device 600. Shaking of the image capture device 600 may cause the visual content 650 to depict a shaking scene. The visual content 650 may be stabilized to remove/reduce the amount of shaking depicted within the visual content 650. For instance, the visual content 650 may be rotated to offset the rotation of the visual content 650 caused by the shaking. The rotation may offset the shaking of the image capture device so that the visual content depicts the scene with no shaking/less shaking.

The rotation of the visual content for stabilization may be defined/expressed in the image reference frame. The image reference frame may use the image/video frame/visual content as the frame of reference. The rotation of the visual content for stabilization may include changes in the orientation of the visual content in the image reference frame. The rotation of the visual content for stabilization may include rotation between the corresponding orientation of the image capture device (image capture device orientation when the visual content of a video frame was captured) and the image reference frame. The rotation of the visual content for stabilization (image orientation or IORI) may be defined/expressed as quaternion specifying the rotation between the corresponding orientation of the image capture device and the image reference frame.

The motion component 116 may be configured to obtain motion information and/or other information. In some implementations, the motion component 116 may be configured to identify the motion information associated with the video and obtain the associated motion information. In some implementations, the motion information for the video may be stored with the video. For example, the motion information for the video may be stored as metadata of the video, and the motion component 116 may be configured to obtain the motion information by extracting the motion information from the metadata of the video. In some implementations, the motion information may be generated by one or more motion sensors of the image capture device. For instance, the motion information may be generated by one or more Global Position System (GPS) sensors of the image capture device.

The motion information for the video may characterize the direction of motion of the image capture device during the capture of the video in an earth reference frame. The motion information for the video may characterize the direction of motion of the image capture device at different moments during the capture of the video in the earth reference frame. The motion information may characterize the direction of motion of the image capture device during the capture of the video by defining, describing, identifying, quantifying, reflecting, and/or otherwise characterizing the motion of the image capture device during the capture of the video.

The motion of the image capture device may refer to the movement of the image capture device. The motion of the image capture device may refer to changes in the physical location of the image capture device. The motion of the image capture device may include translational motion (e.g., lateral and/or vertical movement) and/or rotational motion (e.g., rotation of the image capture device about yaw axis, pitch axis, and/or roll axis). The direction of motion of the image capture device may refer to the direction in which the image capture device moved. The motion information for the video may characterize the direction of motion of the image capture device during the capture of the video by including information on specific locations, speeds/velocities, and/or acceleration of the image capture device.

The direction of motion of the image capture device may be defined/expressed in the earth reference frame. The earth reference frame may use the earth as the frame of reference. The direction of motion of the image capture device may be defined/expressed in terms of geographical characteristics of the earth. For example, the motion information may characterize the direction of motion of the image capture device during the capture of the video by including GPS locations of the image capture device during the capture of the video. GPS locations of the image capture device may include longitude and latitude locations of the image capture device. GPS locations of the image capture device may further include altitude locations of the image capture device. GPS locations of the image capture device may further include speed (e.g., 2D speed, 3D speed, speed north, speed east, speed down). The direction of motion of the image capture device may be determined from the GPS locations of the image capture device. In some implementations, the direction of motion of the image capture device may be determined from the GPS locations of the image capture device by projection of the GPS locations of the image capture device to earth coordinates. In some implementations, the direction of motion of the image capture device may be determined from the GPS locations of the image capture device by without projection of the GPS locations of the image capture device to earth coordinates. For example, the direction of motion of the image capture device may be determined based on the difference between the longitude, latitude, and/or altitude angles. The difference in the angles may be used to determine the direction of motion of the image capture device.

The direction of motion of the image capture device may indicate how the image capture device is moving with respect to the earth, but the direction of motion of the image capture device may not indicate how the image capture device is moving with respect to the image capture device/the visual content captured by the image capture device.

The reference frame component 118 may be configured to merge the orientations of the image capture device during the capture of the video in the image capture device reference frame and the direction of motion of the image capture device during the capture of the video in the earth reference frame into a single reference frame. Merging the orientations of the image capture device in the capture device reference frame and the direction of motion of the image capture device in the earth reference frame into a single reference frame may include combining, converting, joining, unifying, utilizing, and/or otherwise merging the orientation of the image capture device in the capture device reference frame and the direction of motion of the image capture device in the earth reference frame into the single reference frame. The orientations of the image capture device and the direction of motion of the image capture device may be merged into an existing reference frame (the capture device reference frame, the earth reference frame) or a new reference frame. Merging the orientations of the image capture device in the image capture device reference frame and the direction of motion of the image capture device in the earth reference frame into a single reference frame may include determine the relationships between the orientations of the image capture device in the capture device reference frame and the direction of motion of the image capture device in the earth reference frame.

The orientations of the image capture device during the capture of the video in the image capture device reference frame and the direction of motion of the image capture device during the capture of the video in the earth reference frame may be merged into a single reference frame based on the direction of gravity with respect to the image capture device during the capture of the video, the direction of north with respect to the image capture device during the capture of the video, and/or other information. The direction of the gravity defined/expressed in the image capture device reference frame and the direction of the north defined/expressed in the image capture device reference frame may be used to merge the orientations of the image capture device in the image capture device reference frame and the direction of motion of the image capture device in the earth reference frame into a single reference frame.

The direction of gravity with respect to the image capture and the direction of north with respect to the image capture device may be used as two orthogonal vectors: one vector indicating the direction of gravity and the other vector indicating the direction of north. These vectors may be projected in the image space/visual content to provide north and gravity directions in the visual content. The north and gravity directions in the visual content may be used to integrate the direction of motion of the image capture device defined/expressed in the earth reference frame. The north and gravity enables directions in the visual content to be identified in the earth reference frame, which enables the direction of motion in the earth reference frame to be projected onto the visual content (image space). In some implementations, the readings from sensors may be noisy and multiple measurements may be averaged to determine the north vector and/or the gravity vector. For example, the direction of gravity with respect to the image capture and the direction of north with respect to the image capture device may be obtained for multiple moments in the video (e.g., three samples per second in the first minute of the video) and averaged to determine the north vector and the gravity vector. In some implementations, CORI and/or IORI may be used to project the visual content to the initial orientation of the image capture device at the beginning of the capture of the video. CORI and/or IORI may be used to determine how the visual content has been rotated compared to the visual content captured at the beginning of video capture and project the direction of motion into the visual content. For instance, the direction of gravity and the direction of north may be used to determine the initial orientation of the image capture device in the earth reference frame, and then CORI and IORI may be applied to determine the earth reference frame in later captured visual content.

Figure 7A:
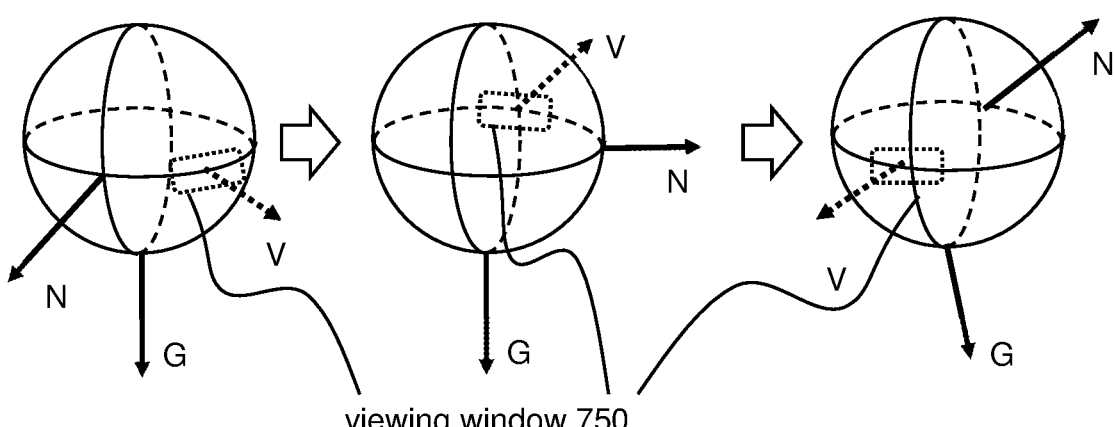
FIG. 7A illustrates example positioning of a viewing window within visual content.
Figure 7B:
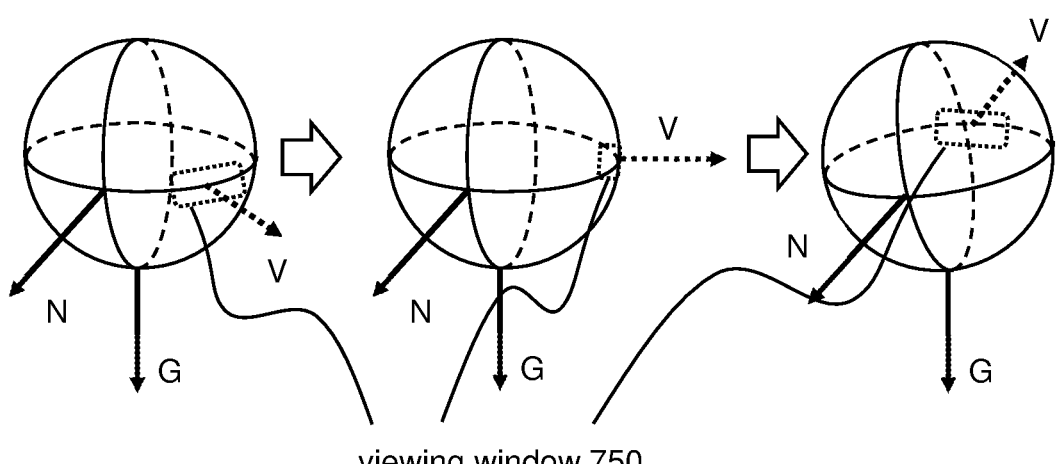
FIG. 7B illustrates example positioning of a viewing window within visual content.

FIG. 7A illustrates example projection of gravity direction, north direction, and motion direction into visual content 700. The visual content 700 may have been captured by an image capture device. The gravity direction (G) and the north direction (N) on the image capture device during video capture may be projected onto the visual content 700 (image space) to provide north and gravity directions in the visual content 700. The gravity direction (G) and the north direction (N) projected onto the visual content 700 may be used to project the direction of motion (e.g., velocity vector, V) into the visual content (image space). If the visual content 700 has been rotated based on changes in orientation of the image capture device during capture, then CORI may be used to account for the rotation of the visual content in projecting the direction of motion. If the visual content 700 has been rotated for stabilization of the visual content, then IORi may be used to account for the rotation of the visual content in projecting the direction of motion. In FIG. 7A, the visual content 700 may be shown without direction locking. FIG. 7B illustrates the projection of gravity direction (G), north direction (N), and motion direction (V) into visual content 700 with direction-locking (e.g., north-locking).

The viewing window A component 120 may be configured to position one or more viewing windows for the visual content. The viewing window A component 120 may be configured to position a viewing window within the field of view of the visual content. The position of a viewing window within the field of view of the visual content may define framing of the visual content. The position of a viewing window within the field of view of the visual content may define how the visual content is framed for presentation.

The position of a viewing window within the field of view of the visual content may refer to placement of the viewing window within the field of view of the visual content. The position of the viewing window within the field of view of the visual content may refer to where and how the viewing window is placed within the field of view of the visual content. The positioning/placement of the viewing window may be defined by one or more of viewing direction, viewing size, viewing rotation, and/or other information. A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis.

A viewing window may define the extents of the visual content to be included within a presentation of the video. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

A viewing window may be positioned within the field of view of the visual content based on the orientations of the image capture device during the capture of the video and the direction of motion of the image capture device during the capture of the video in the single reference frame, and/or other information. A viewing window may be positioned within the field of view of the visual content based on the direction of the motion of the image capture device. A viewing window may be positioned within the field of view of the visual content based on the direction of the motion of the image capture device projected onto the visual content (image space).

For example, the viewing window may be positioned within the field of view of the visual content to include an extent of the visual content in the direction of motion of the image capture device during the capture of the video. The viewing window may be positioned within the field of view of the visual content based on the direction of the motion of the image capture device projected onto the visual content (image space) to provide a view in the direction in which the image capture device moved during video capture (e.g., front, back, left, right, up, down, turn). The viewing window may be positioned within the field of view of the visual content based on the direction of the motion of the image capture device projected onto the visual content (image space) to provide a view that is aligned with the direction of image capture device motion. The viewing window may be positioned to include the direction of image capture device motion at the center/within a center area of the viewing window. The position of the viewing window within the field of view of the visual content may change to follow the direction of image capture device motion. For example, in FIGS. 7A and 7B, a viewing window 750 may be positioned within the field of view of the visual content 700 to include the motion direction (V). The viewing window 750 may be positioned within the field of view of the visual content 700 to include the motion direction (V) at the center/within a center area of the viewing window 750. While the viewing window 750 is shown as being positioned along the equator of the visual content 700, this is merely an example and is not meant to be limiting. The viewing window may be positioned at other vertical positions to include the direction of vertical motion.

As another example, the viewing window may be positioned within the field of view of the visual content based on the direction of the motion of the image capture device projected onto the visual content (image space) to position the viewing window with respect to the direction of motion of the image capture device. The position of the viewing window may be determined with the direction of motion of the image capture device during the capture of the video providing a reference for the framing. The viewing window may be positioned based on the direction of motion of the image capture device during the capture of the video to provide a view with respect to the motion of the image capture device during the capture of the video to (e.g., a back view that is opposite the direction of image capture device motion, a side/top/bottom view that is perpendicular to the direction of image capture device motion). Other positioning of the viewing window is contemplated.

When there is a sharp change in the image capture device motion (e.g., from being directed towards the front of the visual content/image space to side of the visual content/image space), the position of the viewing window may be discontinuously changed (e.g., jump from one position to another position) or continuously changed (e.g., move/pan from one position to another position). In some implementation, changes in the position of the viewing window may be smoothed. For example, the direction of motion of the image capture device may be smoothed (e.g., smooth GPS locations using one or more filters) before positioning the viewing window and/or the viewing window positions may be smoothed to remove/reduce shaking/jitters in viewing window positions.

In some implementations, the viewing window may be positioned to apply horizon leveling. The viewing window may be positioned based on the direction of gravity to apply horizon leveling. For example, the viewing window may be positioned within the visual content with a tilt (roll) to offset tilt of the image capture device during video capture.

In some implementations, the direction of motion of the image capture device at a given moment during the capture of the video may be determined based on a given GPS location of the image capture device at the given moment, one or more future GPS locations of the image capture device at one or more future moments during the capture of the video, and/or other information. The direction of motion of the image capture device at a given moment during the capture of the video may be determined based on changes/differences in the given GPS location of the image capture device at the given moment and the future GPS locations of the image capture device at future moment(s).

For example, the direction of motion of the image capture device at a given moment during the capture of the video may be computed as the instant tangential direction between the latitude and longitude of the image capture device at the given moment and the latitude and longitude of the image capture device at later moment(s). The tangential direction may be converted into a rotational quaternion (e.g., taking the difference between current and previous angles to provide continuous rotations).

The direction of motion of the image capture device at the given moment during the capture of the video may be determined based on a combination of a short-term estimation of the direction of motion of the image capture device and a long-term estimation of the direction of motion of the image capture device, and/or other information. A short-term estimation of the direction of motion may refer to an estimation of the direction of motion of the image capture device that utilizes a short distance (e.g., less than a threshold distance) between two different locations of the image capture device in determining the direction of motion. A short-term estimation of the direction of motion may refer to an estimation of the direction of motion of the image capture device that utilizes a short duration (e.g., less than a threshold duration) between two different locations of the image capture device in determining the direction of motion.

A long-term estimation of the direction of motion may refer to an estimation of the direction of motion of the image capture device that utilizes a long distance (e.g., greater than a threshold distance) between two different locations of the image capture device in determining the direction of motion. A long-term estimation of the direction of motion may refer to an estimation of the direction of motion of the image capture device that utilizes a long duration (e.g., greater than a threshold duration) between two different locations of the image capture device in determining the direction of motion.

For example, the short-term estimation of the direction of motion of the image capture device for a given moment may be determined based on a given GPS location of the image capture device at the given moment and a future GPS location of the image capture device at a future moment, and the long-term estimation of the direction of motion of the image capture device may be determined based on the given GPS location of the image capture device at the given moment and another future GPS location of the image capture device at a different future moment. The future GPS location used for the long-term estimation may be physically and temporally farther apart from the given GPS location than the future GPS location used for the short-term estimation.

In some implementations, the selection of the moments to determine the short-term estimation and the long-term estimation may depend on the speed of the image capture device. For example, low speed of image capture device movement may result in noisy GPS data, and the amount of distance between the image capture device locations used for the short-term estimation and the long-term estimation may be increased.

The short-term estimation and the long-term estimation may be combined to determine the direction of motion of the image capture device. The short-term estimation and the long-term estimation may be combined based on collinearity of the short-term estimation and the long-term estimation.

Figure 8:
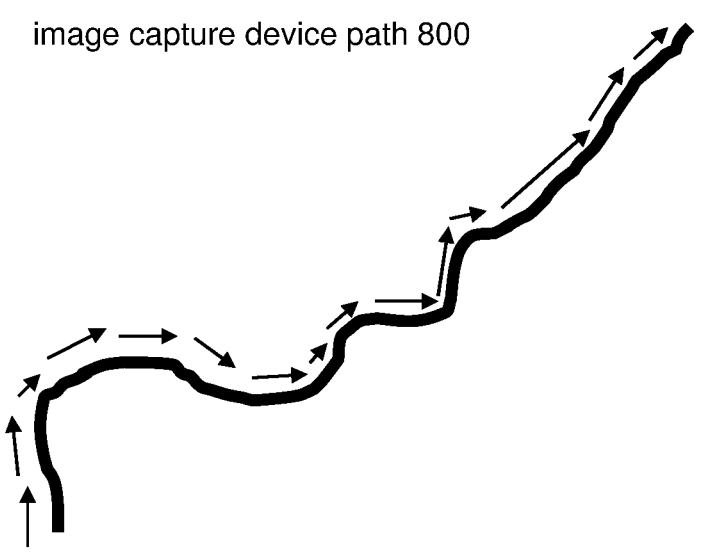
FIG. 8 illustrates an example image capture device path.

FIG. 8 illustrates an example image capture device path 800. The image capture device path 800 may show the path traveled by an image capture device while capturing a video. The direction of motion of the image capture device may be determined by looking at where the image capture device is located at a given moment and where the image capture device is located at a later moment. Looking too far into the future to determine the direction of motion may result in inaccurate determination of the image capture device motion. For example, the image capture device may have moved in a circular path at the beginning of the image capture device path 800. Looking too far into the future may result in determination of the direction of the image capture device motion that skips the circular path. Looking too far into the future may result in a change in the direction of motion being anticipated too early, resulting in the viewing window turning before the moment in the video when the image capture device starts turning.

Looking too near in the future to determine the direction of motion may result in noisy determination of the image capture device motion. For example, the image capture device may have moved left and right while moving in the same general direction. Looking too near in the future may result in determination of the direction of the image capture device motion that follows the short and quick changes in direction of motion.

Rather than attempting to smooth the GPS data/locations, the direction of motion of the image capture device may be determined by combining the short-term estimation and the long-term estimation of the direction of motion of the image capture device. The short-term estimation and the long-term estimation may be combined based on collinearity of the direction from the short-term estimation and the direction from the long-term estimation such that the long-term estimation has greater impact when the directions from the two estimations are colinear and the long-term estimation has less impact when the directions from the two estimations diverge. The impact of the long-term estimation of the direction of motion of the image capture device on the determination of the direction of motion of the image capture device may increase with greater collinearity between the short-term estimation of the direction of motion of the image capture device and the long-term estimation of the direction of motion of the image capture device. The impact of the long-term estimation of the direction of motion of the image capture device on the determination of the direction of motion of the image capture device may decrease with less collinearity between the short-term estimation of the direction of motion of the image capture device and the long-term estimation of the direction of motion of the image capture device.

Such a combination of the short-term estimation and the long-term estimation may give more importance to the long term estimation when the two estimations are colinear and give less importance to the long term estimation when the two estimations diverge. For example, the short-term estimation and the long-term estimation of the direction of motion may be combined using a dot product, which is proportional to the cosine of the angle between the directions from the two estimations. The combination of the short-term estimation and the long-term estimation may smooth the direction estimation (estimation of direction of motion of the image capture device) along the video to produce a smoother framing of the video. Such direction averaging method may be low cost and efficient to run on resource-limited devices (e.g., mobile devices).

In some implementations, the viewing window may be positioned within the field of view of the visual content to simulate roll of the image capture device during the capture of the video. For example, the roll of the viewing window may be changed to simulate different roll of the image capture device during capture of the video. The positioning of the viewing window to simulate the roll of the image capture device may be determined based on changes in the direction of motion the image capture device motion. The positioning of the viewing window to simulate the roll of the image capture device may be determined based on the amount (angle) by which the direction of motion changes and/or the speed with which the direction of motion changes.

In some implementations, the viewing window may be positioned within the field of view of the visual content to simulate pitch of the image capture device during the capture of the video. For example, the viewing window may be positioned above or below the horizon line in the visual content to simulate the image capture device being pitched up or down during the capture of the video. For example, the vertical position of the viewing window may be changed to simulate different direction and amount of pitching during capture of the video. The positioning of the viewing window to simulate the pitch of the image capture device may be determined based on changes in altitude of the image capture device. For example, the position of the viewing window may be moved upwards when the image capture device was moving upwards during video capture and the position of the viewing window may be moved downwards when the image capture device was moving downwards during video capture.

The orientation B component 122 may be configured to obtain orientation information for the video and/or other information. In some implementations, the orientation B component 122 may be configured to identify the orientation information associated with the video and obtain the associated orientation information. In some implementations, the orientation information for the video may be stored with the video. For example, the orientation information for the video may be stored as metadata of the video, and the orientation B component 122 may be configured to obtain the orientation information by extracting the orientation information from the metadata of the video.

The orientation information may characterize orientations of the image capture device during the capture of the video. The orientation information for the video may characterize the orientations of the image capture device at different moments during the capture of the video. The orientation information may characterize the orientations of the image capture device during the capture of the video by defining, describing, identifying, quantifying, reflecting, and/or otherwise characterizing the orientations of the image capture device during the capture of the video.

In some implementations, the orientation information for the video may be obtained based on inversion of the rotation of the visual content to direction-lock the visual content. Inversion of the rotation of the visual content to direction-lock the visual content may include extraction of the rotation of the visual content to direction-lock the visual content. Inversion of the rotation of the visual content to direction-lock the visual content may include determining the inverse of the visual content rotation to undo the direction-locking of the visual content.

For example, the visual content may have been rotated based on change in the orientation of the image capture device during the capture of the video to direction-lock the visual content and simulate a view as if captured by the image capture device without the changes in orientation. The direction-locking may remove changes in the image capture device orientation from being depicted in the visual content. The rotations of the visual content to perform direction locking may be defined/expressed as a quaternion. For example, rotations of individual video frames to rotate the visual content towards the initial image capture device orientation may be defined/expressed as a quaternion.

FIG. 9 illustrates an image capture device in different orientations. At a given moment during capture of a video, the image capture device may be oriented in a capture orientation 910. Performing direction locking and horizon leveling may modify (e.g., rotate) the visual content such that the visual content depicts a view that would have been captured by an image capture device in a direction and horizon locked orientation 920. The modification of the visual content to direction lock the visual content may be inverted to modify the visual content such that the visual content depicts a view that was captured by the image capture device oriented in a horizon-locked and front-directed orientation 930.

The combination of direction-lock and horizon-lock quaternion may provide a quaternion to reframe the visual content in a unique direction with stabilized horizon. This quaternion may be inverted to obtain rotations that will change the visual content from depicting the direction-locked view to a view that is horizon leveled and shows the scene captured through the "front" image sensor (image sensor that by default captures the front spatial part of the visual content) to provide a view in the direction of motion or captured through the "back" images sensor (image sensor that by default captures the back spatial part of the visual content) to provide a view away from/inverse the direction of motion (rearview mirror mode). The inverted quaternion may be decomposed into Euler angles (pan, roll, pitch), and the pan angles may be used to rotate the visual content to show the view captured through the front/back image sensor. Roll and pitch angles may be removed to horizon level the visual content. In some implementations, the Euler angles may be obtained without inverting the quaternion. For example, the pan angles may be extracted from the quaternion and then the extracted pan angles may be inverted. A smoothed front/back-lens view may be simulated within the visual content by smoothing the pan angles over time (e.g., smoothing the instantaneous pan angles values over time with a low-pass filter). Such a view deviates from the direction locking by following the long-term direction of the image capture device motion. High-frequency changes in the image capture device motion is removed/reduced via smoothing of the pan angles. Provision of smoothed views in other directions is contemplated.

The horizon level component 124 may be configured to horizon level the visual content based on the direction of gravity with respect to the image capture device during the capture of the video and/or other information. Horizon leveling of the visual content may produce a view in which the visual content appears to have been captured by a leveled/more leveled image capture device. Horizon leveling of the visual content may include rotation of the visual content such that the bottom of the visual content is aligned with the gravity direction. Horizon leveling of the visual content may include rotation of the viewing window to account for the bottom of the visual content not being aligned with the gravity direction. In some implementations, horizon leveling quaternions may be computed from the direction-locked position using gravity vectors.

The pan component 126 may be configured to determine panning of the image capture device during the capture of the video based on the orientations of the image capture device during the capture of the video and/or other information. Determining panning of the image capture device may include ascertaining, calculating, computing, establishing, finding, setting, and/or otherwise determining the panning of the image capture device. The panning of an image capture device may refer to rotation of the image capture device about its yaw axis. Panning of an image capture device may refer to a horizontal change in the direction in which the image capture device is pointed (e.g., swiveling left or right). The panning of the image capture device during the capture of the video may be determined based on based on changes in pan positions from the orientations of the image capture device during the capture of the video. Pan positions of the image capture device may refer to horizontal component of the direction in which the image capture device is pointed.

In some implementations, changes in pan positions from the orientations of the image capture device during the capture of the video may be smoothed for the determination of the panning of the image capture device. That is, the pan component 126 may smooth the panning that was experienced by the image capture device during capture of the video. The panning may be smoothed using one or more filters to remove high frequency changes in the pan positions.

In some implementations, changes in pitch positions and changes in roll positions may be discarded from the orientations of the image capture device during the capture of the video for the determination of the panning of the image capture device. Pitch positions of the image capture device may refer to vertical component of the direction in which the image capture device is pointed. Roll positions of the image capture device may refer to rotational position of the image capture device about the direction in which the image capture device is pointed. Changes in pitch positions (e.g., image capture device being pitched up or down) and changes in roll positions (e.g., image capture device being rotated about the direction in which the image capture device is pointed) may be removed from the orientations of the image capture device during the capture of the video to determine the panning of the image capture device. Determining the panning of the image capture device may include extracting the pan position changes from the orientations of the image capture device during the capture of the video while not extracting the pitch position changes or the roll position changes.

For example, the direction lock of the visual content may be computed from CORI quaternion. In some implementations, IORI quaternions may be used to account for changes in the visual content from stabilization. The quaternions may be decomposed into corresponding Euler angles. Pan angles may be inverted (e.g., extracted) from the quaternions. A filter (e.g., low-pass filter) may be applied to the pan angles to smooth the pan angles, which results in removal of small/high frequency motion and the global direction changes being preserved. A new quaternion may be generated by smoothed, inverted pan angles. In some implementations, artificial roll effect may be generated based on the pan angles.

Use of the CORI/metadata to determining panning of the image capture device may be computationally faster and less expensive than video analysis to determining panning of the image capture device. Smoothing the pan extracted from the CORI may cause the pan to smoothly follow the original pan of the image capture device. Artificial roll may be introduced based on the direction and/or the speed of the smoothed pan.

Figure 10A:
FIG. 10A illustrates an example image capture device path.

FIG. 10A illustrates an example image capture device path 1010. The image capture device path 1010 may show the path traveled by an image capture device while capturing a video. Information on a part of the path traveled by the image capture device may be missing from the image capture device path 1010.

Figure 10B:
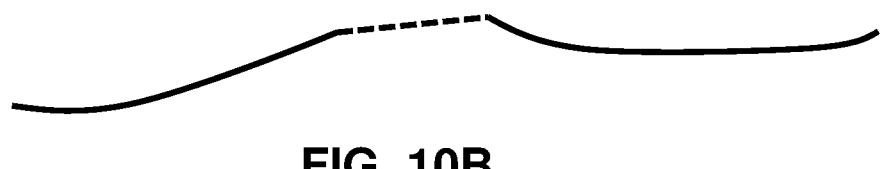
FIG. 10B illustrates an example image capture device path.

FIG. 10B illustrates an example image capture device path 1020. In the image capture device path 1020, the missing part of the image capture device path 1010 may be filled to connect the image capture device path 1010 across the gap. For example, the missing part of the path may be filled using interpolation. However, such filling of the gap in the image capture device path 1010 may result in the gap being filled with a straight line. If the image capture device did not move in a straight line in the gap, the direction of image capture device motion from the image capture device path 1020 may be inaccurate. For example, if the image captured device turned/panned in the gap, interpolation would not accurately reconstruct the image capture device motion.

Figure 10C:
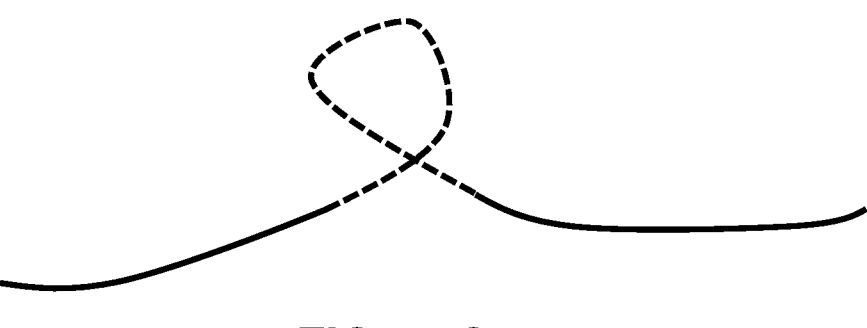
FIG. 10C illustrates an example image capture device path.

FIG. 10C illustrates an example image capture device path 1030. In the image capture device path 1030, the missing part of the image capture device path 1010 may be filled using pan extracted from the orientation information. The missing part of the image capture device path 1010 may be filled using the smoothed, inverted pan angles extracted from rotation of the visual content to direction-lock the visual content (e.g., CORI quaternion and/or IORI quaternion). The panning of the image capture device in the missing part of the image capture device path 1010 may be inverted from the rotations of the visual content to direction-lock the visual content.

The viewing window B component 128 may be configured to position one or more viewing windows for the visual content. The viewing window B component 128 may be configured to position a viewing window within the field of view of the visual content. The viewing window B component 128 may be configured to position a viewing window within the field of view of the visual content based on the panning of the image capture device during the capture of the video and/or other information. A viewing window may be positioned within the field of view of the visual content based on the smoothed, inverted pan angles and/or other information. The smoothed, inverted pan angles may indicate the smoothed direction of the motion of the image capture device during the capture of the video.

For example, the viewing window may be positioned within the field of view of the visual content to include an extent of the visual content in the direction of motion of the image capture device during the capture of the video. The viewing window may be positioned within the field of view of the visual content based on the panning of the image capture device during the capture of the video to provide a view in the smoothed direction in which the image capture device moved during video capture. The viewing window may be positioned within the field of view of the visual content based on the panning of the image capture device to provide a view that is aligned with the smoothed direction of image capture device motion. The viewing window may be positioned to include the smoothed direction of image capture device motion at the center/within a center area of the viewing window. The position of the viewing window within the field of view of the visual content may change to follow the smoothed direction of image capture device motion.

In some implementations, the viewing window may be positioned within the field of view of the visual content to simulate roll of the image capture device during the capture of the video. For example, the roll of the viewing window may be changed to simulate different roll of the image capture device during capture of the video. The positioning of the viewing window to simulate the roll of the image capture device may be determined based on the panning of the image capture device during the capture of the video and/or other information. The amount of the simulated roll of the image capture device may be determined based on the speed of the panning of the image capture device and/or other information. The direction in which the roll of the image capture device is simulated may be determined based on the direction of the panning of the image capture device and/or other information. For example, the artificial roll effect may be generated based on difference in pan positions at different moments in the video (e.g., difference in pan values at $t_0$ and $t_1$). The artificial roll effect for a given moment in the video may be determined based the difference between the pan positions at the given moment and a prior/later moment or based on the difference between the pan positions at a prior moment and a later moment. In some implementations, the direction of the artificial roll may be in the direction of the pan change. In some implementation, the amount of the artificial roll effect may be determined as a fraction of the pan difference (e.g., 0.25*pan difference). In some implementations, the amount of the artificial roll effect may be bounded by a range (e.g., not allowed to exceed±10 degrees).

Figure 11A:
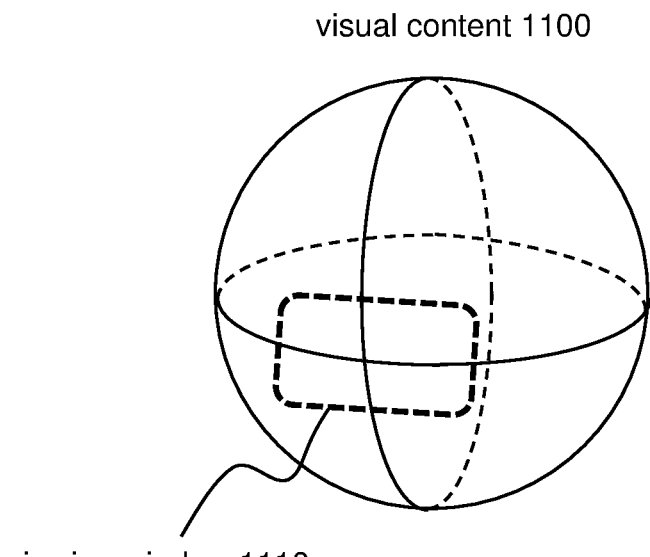
FIG. 11A illustrates example position of a viewing window within visual content.
Figure 11B:
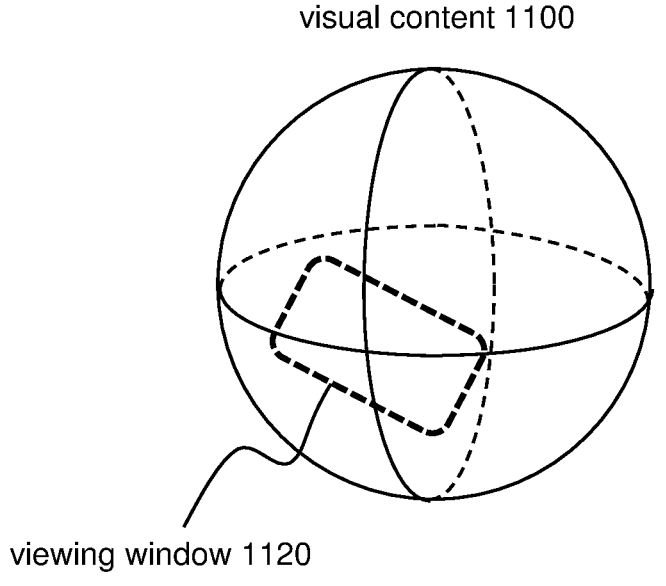
FIG. 11B illustrates example position of a viewing window within visual content.

FIGS. 11A and 11B illustrate example positions of a viewing window 1110 within visual content 1100. In FIG. 11A, the viewing window 1110 may be positioned to provide a horizon-leveled punchout of the visual content 1100. In FIG. 11B, the viewing window 1110 may be positioned to provide a tilted punchout of the visual content 1100. The direction in which the viewing window 1110 is tilted may be determined based on the direction in which the image capture device was panned during capture of the visual content 1100. The amount by which the viewing window 1110 is tilted may be determined based on the speed with which the image capture device was panned during capture of the visual content 1100.

In some implementations, the viewing window may be positioned within the field of view of the visual content based on the panning of the image capture device for entirety of the progress length of the video. For example, the panning of the image capture device extracted from visual content rotation to direction-lock the visual content may be used to determine where and how the viewing window is positioned for the entirety of the video.

In some implementations, the viewing window may be positioned within the field of view of the visual content based on the panning of the image capture device for a portion of the progress length of the video in which north-direction information for the video and/or motion information for the video is unavailable. The north-direction information may characterize the direction of north with respect to the image capture device during the capture of the video. The motion information may characterize the direction of motion of the image capture device during the capture of the video in the earth reference frame. When the north-direction information for the video and the motion information for the video is available, the viewing window may be positioned based on the north-direction information for the video and the motion information (using the merged reference framing). When the north-direction information for the video and/or the motion information for the video is unavailable, the viewing window may be positioned based on the panning of the image capture device (using the inverted direction-lock framing).

In some implementations, the viewing window may be positioned within the field of view of the visual content based on the panning of the image capture device for a portion of the progress length of the video in which motion information for the video is unavailable. For example, the panning of the image capture device extracted from visual content rotation to direction-lock the visual content may be used to determine where and how the viewing window is positioned for the temporal part(s) of the video in which motion information for the video is missing or of low accuracy. The panning of the image capture device extracted from visual content rotation to direction-lock the visual content may be used to determine where and how the viewing window is positioned for the temporal part(s) of the video in which motion information for the video is unavailable for a threshold duration of time or a threshold distance. If the information is unavailable for less than the threshold duration of time or the threshold distance, the missing positions of the viewing window may be filled via interpolation of viewing window positions from the merged reference framing. If the information is unavailable for more than the threshold duration of time or the threshold distance, then the viewing window may be positioned using the panning of the image capture device using the inverted direction-lock framing.

The presentation component 130 may be configured to present the visual content on one or more electronic displays. Presenting the visual content on an electronic display may include displaying, exhibiting, showing, and/or otherwise presenting the visual content on the electronic display. Presenting the visual content on an electronic display may include showing a view of the visual content on the electronic display, generating/storing a video clip for playback on the electronic display, and/or otherwise presenting the visual content on the electronic display.

The visual content may be presented based on the viewing window and/or other information. Presentation of the visual content may include presentation of one or more punchouts of the visual content. One or more punchouts of the visual content may be presented to provide views of one or more different spatial parts of the visual content. A punchout of the visual content may be presented based on a viewing window and/or other information. Presentation of the visual content may include presentation of the extent of the visual content within the viewing window. Presentation of the visual content may include playback of audio content of the video. In some implementations, different spatial parts of the video may be associated with different directions of spatial audio, and the directions of the spatial audio corresponding to the punched out extents of the visual content may be played in the presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIGS. 2A and 2B illustrate methods 200, 250 for framing videos. The operations of methods 200, 250 presented below are intended to be illustrative. In some implementations, methods 200, 250 may be accomplished with one or more additional operations not described, and/or without one or more of the operations discussed. In some implementations, two or more of the operations may occur substantially simultaneously.

In some implementations, methods 200, 250 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of methods 200, 250 in response to instructions stored electronically on one or more electronic storage media. The one or more processing devices may include one or more devices configured through hardware, firmware, and/or software to be specifically designed for execution of one or more of the operations of methods 200, 250.

Referring to FIG. 2A and method 200, at operation 201, video information may be obtained. The video information may define a video. The video may have a progress length. The video may include visual content viewable as a function of progress through the progress length. The visual content may have a field of view. The video may have been captured by an image capture device. In some implementations, operation 201 may be performed by a processor component the same as or similar to the video component 102 (Shown in FIG. 1 and described herein).

At operation 202, gravity-direction information may be obtained. The gravity-direction information for the video may characterize a direction of gravity with respect to the image capture device during the capture of the video. In some implementations, operation 202 may be performed by a processor component the same as or similar to the gravity-direction component 104 (Shown in FIG. 1 and described herein).

At operation 203, north-direction information may be obtained. The north-direction information for the video may characterize a direction of north with respect to the image capture device during the capture of the video. In some implementations, operation 203 may be performed by a processor component the same as or similar to the north-direction component 112 (Shown in FIG. 1 and described herein).

At operation 204, orientation information may be obtained. The orientation information for the video may characterize orientations of the image capture device during the capture of the video in an image capture device reference frame. In some implementations, operation 204 may be performed by a processor component the same as or similar to the orientation A component 114 (Shown in FIG. 1 and described herein).

At operation 205, motion information may be obtained. The motion information for the video may characterize the direction of motion of the image capture device during the capture of the video in an earth reference frame. In some implementations, operation 205 may be performed by a processor component the same as or similar to the motion component 116 (Shown in FIG. 1 and described herein).

At operation 206, the orientations of the image capture device during the capture of the video in the image capture device reference frame and the direction of motion of the image capture device during the capture of the video in the earth reference frame may be merged into a single reference frame based on the direction of gravity with respect to the image capture device during the capture of the video, the direction of north with respect to the image capture device during the capture of the video, and/or other information. In some implementations, operation 206 may be performed by a processor component the same as or similar to the reference component 118 (Shown in FIG. 1 and described herein).

At operation 207, a viewing window may be positioned within the field of view of the visual content based on the orientations of the image capture device during the capture of the video and the direction of motion of the image capture device during the capture of the video in the single reference frame, and/or other information. In some implementations, operation 207 may be performed by a processor component the same as or similar to the viewing window A component 120 (Shown in FIG. 1 and described herein).

At operation 208, the visual content may be presented on an electronic display based on the viewing window and/or other information. In some implementations, operation 208 may be performed by a processor component the same as or similar to the presentation component 130 (Shown in FIG. 1 and described herein).

Referring to FIG. 2B and method 250, at operation 251, video information may be obtained. The video information may define a video. The video may have a progress length. The video may include visual content viewable as a function of progress through the progress length. The visual content may have a field of view. The video may be captured by an image capture device. The visual content may be rotated based on changes in orientation of the image capture device during the capture of the video to direction-lock the visual content and simulate a view as if captured by the image capture device without the changes in orientation. In some implementations, operation 251 may be performed by a processor component the same as or similar to the video component 102 (Shown in FIG. 1 and described herein).

At operation 252, gravity-direction information may be obtained. The gravity-direction information for the video may characterize a direction of gravity with respect to the image capture device during the capture of the video. In some implementations, operation 252 may be performed by a processor component the same as or similar to the gravity-direction component 104 (Shown in FIG. 1 and described herein).

At operation 253, orientation information may be obtained. The orientation information for the video may characterize orientations of the image capture device during the capture of the video. In some implementations, operation 253 may be performed by a processor component the same as or similar to the orientation B component 122 (Shown in FIG. 1 and described herein).

At operation 254, the visual content may be horizon leveled based on the direction of gravity with respect to the image capture device during the capture of the video and/or other information. In some implementations, operation 254 may be performed by a processor component the same as or similar to the horizon level component 124 (Shown in FIG. 1 and described herein).

At operation 255, panning of the image capture device during the capture of the video may be determined based on the orientations of the image capture device during the capture of the video and/or other information. In some implementations, operation 255 may be performed by a processor component the same as or similar to the pan component 126 (Shown in FIG. 1 and described herein).

At operation 256, a viewing window may be positioned within the field of view of the visual content based on the panning of the image capture device during the capture of the video and/or other information. In some implementations, operation 256 may be performed by a processor component the same as or similar to the viewing window B component 128 (Shown in FIG. 1 and described herein).

At operation 257, the visual content may be presented on an electronic display based on the viewing window and/or other information. In some implementations, operation 257 may be performed by a processor component the same as or similar to the presentation component 130 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for framing videos, the system comprising:
one or more physical processors configured by machine-readable instructions to:
obtain video information defining a video, the video having a progress length, the video including visual content viewable as a function of progress through the progress length, the visual content having a field of view, the video captured by an image capture device;
obtain gravity-direction information for the video, the gravity-direction information characterizing a direction of gravity with respect to the image capture device during the capture of the video;
obtain north-direction information for the video, the north-direction information characterizing a direction of north with respect to the image capture device during the capture of the video;
obtain orientation information for the video, the orientation information characterizing orientations of the image capture device during the capture of the video in an image capture device reference frame, wherein the orientation information characterizes the orientations of the image capture device during the capture of the video by characterizing an initial orientation of the image capture device at beginning of the capture of the video and changes from the initial orientation of the image capture device during the capture of the video;
obtain motion information for the video, the motion information characterizing a direction of motion of the image capture device during the capture of the video in an earth reference frame, wherein the motion information characterizes the direction of motion of the image capture device during the capture of the video by including GPS locations of the image capture device during the capture of the video;
determine the direction of motion of the image capture device during the capture of video,
wherein determination of the direction of motion of the image capture device at a given moment during the capture of the video is determined based on a combination of a short-term estimation of the direction of motion of the image capture device and a long-term estimation of the direction of motion of the image capture device;
the short-term estimation of the direction of motion of the image capture device is determined based on a given GPS location of the image capture device at the given moment and a first future GPS location of the image capture device at a first future moment;
the long-term estimation of the direction of motion of the image capture device is determined based on the given GPS location of the image capture device at the given moment and a second future GPS location of the image capture device at a second future moment:
the second future GPS location is farther apart from the given GPS location than the first future GPS location; and
an impact of the long-term estimation of the direction of motion of the image capture device on the determination of the direction of motion of the image capture device increases with greater collinearity between the short-term estimation of the direction of motion of the image capture device and the long-term estimation of the direction of motion of the image capture device:
merge the orientations of the image capture device during the capture of the video in the image capture device reference frame and the direction of motion of the image capture device during the capture of the video in the earth reference frame into a single reference frame based on the direction of gravity with respect to the image capture device during the capture of the video and the direction of north with respect to the image capture device during the capture of the video;
position a viewing window within the field of view of the visual content based on the orientations of the image capture device during the capture of the video and the direction of motion of the image capture device during the capture of the video in the single reference frame, wherein the viewing window is positioned within the field of view of the visual content to include an extent of the visual content in the direction of motion of the image capture device during the capture of the video; and present the visual content on an electronic display based on the viewing window.

2. A system for framing videos, the system comprising:
one or more physical processors configured by machine-readable instructions to:

obtain video information defining a video, the video having a progress length, the video including visual content viewable as a function of progress through the progress length, the visual content having a field of view, the video captured by an image capture device;

obtain gravity-direction information for the video, the gravity-direction information characterizing a direction of gravity with respect to the image capture device during the capture of the video;

obtain north-direction information for the video, the north-direction information characterizing a direction of north with respect to the image capture device during the capture of the video;

obtain orientation information for the video, the orientation information characterizing orientations of the image capture device during the capture of the video in an image capture device reference frame;

obtain motion information for the video, the motion information characterizing a direction of motion of the image capture device during the capture of the video in an earth reference frame;

merge the orientations of the image capture device during the capture of the video in the image capture device reference frame and the direction of motion of the image capture device during the capture of the video in the earth reference frame into a single reference frame based on the direction of gravity with respect to the image capture device during the capture of the video and the direction of north with respect to the image capture device during the capture of the video;

position a viewing window within the field of view of the visual content based on the orientations of the image capture device during the capture of the video and the direction of motion of the image capture device during the capture of the video in the single reference frame; and present the visual content on an electronic display based on the viewing window, wherein the motion information characterizes the direction of motion of the image capture device during the capture of the video by including GPS locations of the image capture device during the capture of the video, wherein the viewing window is positioned within the field of view of the visual content to include an extent of the visual content in the direction of motion of the image capture device during the capture of the video, wherein the direction of motion of the image capture device at a given moment during the capture of the video is determined based on a given GPS location of the image capture device at the given moment and one or more future GPS locations of the image capture device at one or more future moments during the capture of the video, wherein the direction of motion of the image capture device at the given moment during the capture of the video is determined based on a combination of a short-term estimation of the direction of motion of the image capture device and a long-term estimation of the direction of motion of the image capture device, and
wherein:

the short-term estimation of the direction of motion of the image capture device is determined based on the given GPS location of the image capture device at the given moment and a first future GPS location of the image capture device at a first future moment;

the long-term estimation of the direction of motion of the image capture device is determined based on the given GPS location of the image capture device at the given moment and a second future GPS location of the image capture device at a second future moment; and the second future GPS location is farther apart from the given GPS location than the first future GPS location, and wherein an impact of the long-term estimation of the direction of motion of the image capture device on the determination of the direction of motion of the image capture device increases with greater collinearity between the short-term estimation of the direction of motion of the image capture device and the long-term estimation of the direction of motion of the image capture device.

3. The system of claim 2, wherein the video includes a spherical video, the spherical video including visual content having a spherical field of view.

4. The system of claim 2, wherein the orientation information characterizes the orientations of the image capture device during the capture of the video by characterizing an initial orientation of the image capture device at beginning of the capture of the video and changes from the initial orientation of the image capture device during the capture of the video.

5. A method for framing videos, the method performed by a computing system including one or more processors, the method comprising:

obtaining, by the computing system, video information defining a video, the video having a progress length, the video including visual content viewable as a function of progress through the progress length, the visual content having a field of view, the video captured by an image capture device;

obtaining, by the computing system, gravity-direction information for the video, the gravity-direction information characterizing a direction of gravity with respect to the image capture device during the capture of the video;

obtaining, by the computing system, north-direction information for the video, the north-direction information characterizing a direction of north with respect to the image capture device during the capture of the video;

obtaining, by the computing system, orientation information for the video, the orientation information characterizing orientations of the image capture device during the capture of the video in an image capture device reference frame;

obtaining, by the computing system, motion information for the video, the motion information characterizing a direction of motion of the image capture device during the capture of the video in an earth reference frame;

merging, by the computing system, the orientations of the image capture device during the capture of the video in the image capture device reference frame and the direction of motion of the image capture device during the capture of the video in the earth reference frame into a single reference frame based on the direction of gravity with respect to the image capture device during the capture of the video and the direction of north with respect to the image capture device during the capture of the video;

positioning, by the computing system, a viewing window within the field of view of the visual content based on the orientations of the image capture device during the capture of the video and the direction of motion of the image capture device during the capture of the video in the single reference frame; and presenting, by the computing system, the visual content on an electronic display based on the viewing window, wherein the motion information characterizes the direction of motion of the image capture device during the capture of the video by including GPS locations of the image capture device during the capture of the video, wherein the viewing window is positioned within the field of view of the visual content to include an extent of the visual content in the direction of motion of the image capture device during the capture of the video, wherein the direction of motion of the image capture device at a given moment during the capture of the video is determined based on a given GPS location of the image capture device at the given moment and one or more future GPS locations of the image capture device at one or more future moments during the capture of the video, wherein the direction of motion of the image capture device at the given moment during the capture of the video is determined based on a combination of a short-term estimation of the direction of motion of the image capture device and a long-term estimation of the direction of motion of the image capture device, wherein:

the short-term estimation of the direction of motion of the image capture device is determined based on the given GPS location of the image capture device at the given moment and a first future GPS location of the image capture device at a first future moment;

the long-term estimation of the direction of motion of the image capture device is determined based on the given GPS location of the image capture device at the given moment and a second future GPS location of the image capture device at a second future moment; and the second future GPS location is farther apart from the given GPS location than the first future GPS location; and wherein an impact of the long-term estimation of the direction of motion of the image capture device on the determination of the direction of motion of the image capture device increases with greater collinearity between the short-term estimation of the direction of motion of the image capture device and the long-term estimation of the direction of motion of the image capture device.

6. The method of claim 5, wherein the video includes a spherical video, the spherical video including visual content having a spherical field of view.

7. The method of claim 5, wherein the orientation information characterizes the orientations of the image capture device during the capture of the video by characterizing an initial orientation of the image capture device at beginning of the capture of the video and changes from the initial orientation of the image capture device during the capture of the video.

* * * * *